(12) United States Patent
Tan et al.

(10) Patent No.: US 7,057,155 B2
(45) Date of Patent: Jun. 6, 2006

(54) COLOR SENSOR SYSTEM WITH VOLTAGE OFFSET CORRECTION

(76) Inventors: Boon Keat Tan, 26, Lorogn Permal 2, Gelugor, 11700 Penang (MY); Selvan Maniam, 11900 Bayan Baru, Penang (MY)

( * ) Notice: Subject to any disclaimer, the term of this patent is extended or adjusted under 35 U.S.C. 154(b) by 34 days.

(21) Appl. No.: 10/902,674

(22) Filed: Jul. 29, 2004

(65) Prior Publication Data

US 2006/0022121 A1  Feb. 2, 2006

(51) Int. Cl.
*G01J 3/50* (2006.01)
*G01N 21/25* (2006.01)

(52) U.S. Cl. .................... 250/226; 356/416
(58) Field of Classification Search .......... 250/226; 356/416

See application file for complete search history.

(56) References Cited

U.S. PATENT DOCUMENTS

| 5,773,814 A | * | 6/1998 | Phillips et al. ............ 250/208.1 |
| 6,507,159 B1 | | 1/2003 | Muthu |
| 2003/0053157 A1 | * | 3/2003 | Sakakibara et al. ......... 358/514 |

* cited by examiner

*Primary Examiner*—Georgia Epps
*Assistant Examiner*—Brian Livedalen

(57) ABSTRACT

A technique for sensing color involves detecting a portion of incident light that is not filtered by a color filter in addition to portions of the incident light that are filtered by color filters. The output related to the unfiltered light is used along with the outputs related to the filtered light to correct for voltage offsets that affect the amplification of the outputs. In an application, the output related to the unfiltered light is subtracted from the outputs related to the filtered light in a calculation of a linear transformation matrix.

15 Claims, 4 Drawing Sheets

COLOR SENSOR SYSTEM WITH VOLTAGE OFFSET CORRECTION

BACKGROUND OF THE INVENTION

Color sensors are used for color detection, color measurement, and color control in both open and closed loop systems. Typical color sensors convert the primary color components of light, namely red (R), green (G), and blue (B) to analog voltage outputs. FIG. 1 depicts an example of a color sensor 10 that includes a sensor module 12 and a post-sensor amplification unit 14. The sensor module includes R, G, and B bandpass filters 16, 18, and 20 and a photodetector array 22 with individual photodetectors 24, 26, and 28 that are aligned with the color filters to provide color-specific responses. In operation, light 30 is incident on the color filters of the sensor module. Separate portions of the light are filtered by the respective R, G, and B color filters and the filtered light is detected by the corresponding photodetectors. The photocurrent generated by the different photodetectors in response to the filtered light is amplified by amplifiers 30 of the post-sensor amplification unit. Color-specific output voltages ($V_{red}$, $V_{green}$, and $V_{blue}$) are generated in response to the amplification.

Although color sensors as described with reference to FIG. 1 work well, the signals that are output from the amplifiers tend to be skewed by offset voltages at the input terminals of the amplifiers. If not corrected, the offset voltages will negatively impact the performance of the color sensor. Additionally, offset voltages tend to vary in a random nature, which complicates any attempt to correct for the offset.

In view of this, what is needed is a color sensing technique that addresses the offset voltage problem and that is efficient to implement.

SUMMARY OF THE INVENTION

A technique for sensing color involves detecting a portion of incident light that is not filtered by a color filter in addition to portions of the incident light that are filtered by color filters. The output related to the unfiltered light is used along with the outputs related to the filtered light to correct for voltage offsets that affect the amplification of the outputs. In an application, the output related to the unfiltered light is subtracted from the outputs related to the filtered light in a calculation of a linear transformation matrix. Subtracting the output related to the unfiltered light from the outputs related to the filtered light cancels out the offset that is carried in the outputs and produces a linear transformation matrix that incorporates offset correction.

Other aspects and advantages of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar element.

DETAILED DESCRIPTION

Figure 1:
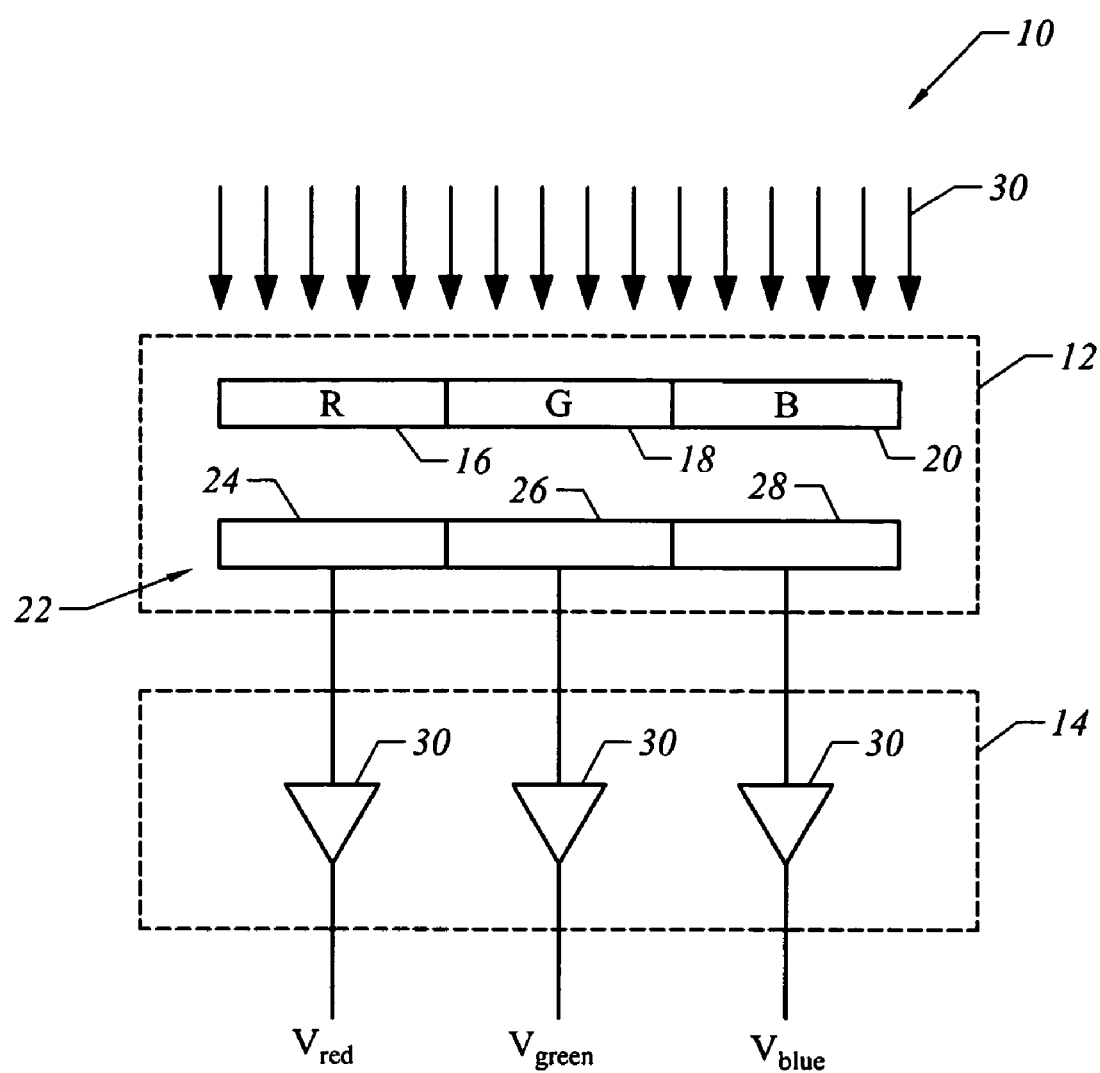
FIG. 1 depicts an example of a color sensor that includes a sensor module and a post-sensor amplification unit as is known in the prior art.
Figure 2:
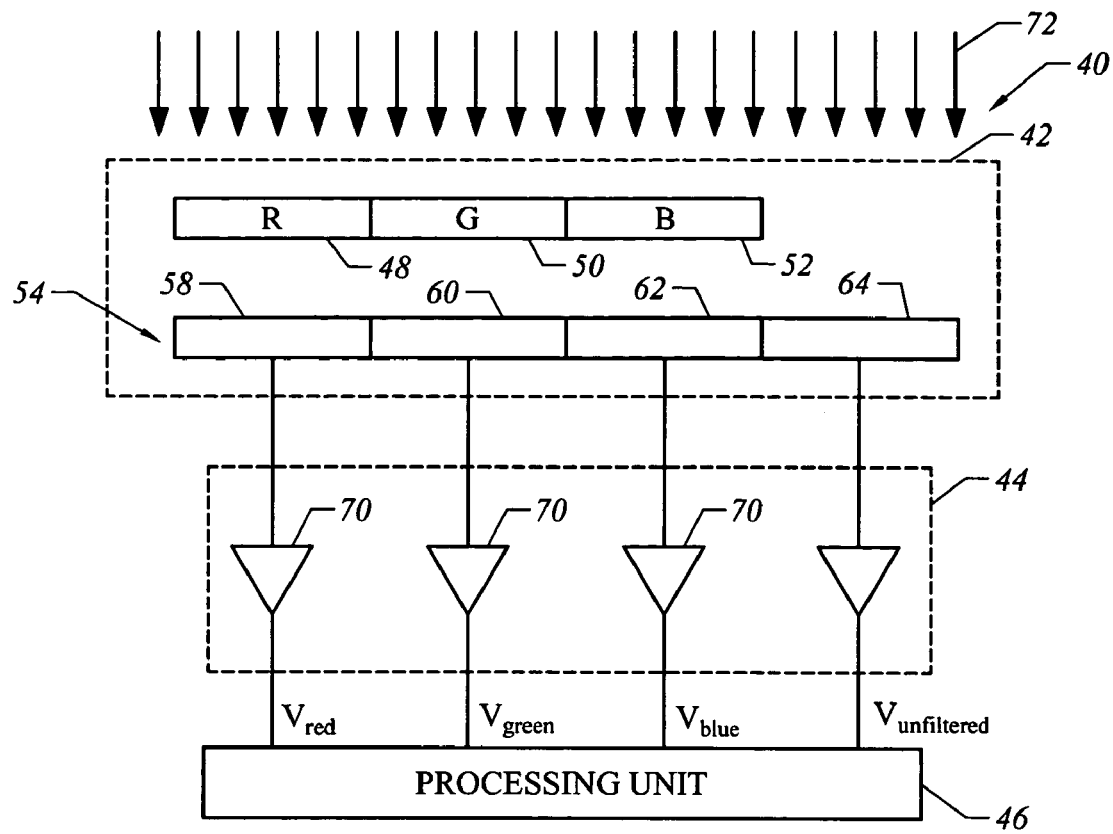
FIG. 2 depicts a color sensor system that includes a photodetector that detects unfiltered light in accordance with the invention.

Sensing color involves detecting a portion of incident light that is not filtered by a color filter in addition to portions of the incident light that are filtered by color filters. The output related to the unfiltered light is used along with the outputs related to the filtered light to correct for voltage offsets that effect the amplification of the outputs. FIG. 2 depicts an embodiment of a color sensor system 40 in accordance with the invention that detects unfiltered light in addition to filtered light. The color sensor system includes a sensor module 42, a post-sensor amplification unit 44, and a processing unit 46.

The sensor module 42 depicted in FIG. 2 includes color filters 48, 50, and 52 and a photodetector array 54. The color filters consist of red (R), green (G), and blue (B) filters. The filters may be, for example, bandpass filters that pass light in the respective R, G, and B spectrums. The color filters may be formed as pigment filters that are coated on top of the photodetector array. The color filters can also be, for example, interference type filters or a combination of interference and pigment filters. In an embodiment, the color filters filter light at color profiles that are similar to the color profiles of human perception. Although filters that pass light in the R, G, and B spectrums are described in this example, filters that pass light in other spectrums are possible.

The photodetector array 54 depicted in FIG. 2 includes photodetectors 58, 60, and 62 that are aligned with the color filters 48, 50, and 52 to detect light that passes through the respective filters. For example, one photodetector is aligned to detect the red filtered light, one photodetector is aligned to detect the green filtered light, and one photodetector is aligned to detect the blue filtered light. In accordance with the invention, the photodetector array also includes a photodetector 64 that is aligned to detect light that is not filtered by the color filters. The light that is not filtered by the color filter is referred to herein as "unfiltered" light. The photodetectors produce photocurrent in proportion to the intensity of the incident light 72. The photocurrent output by the red photodetector represents the intensity of the red component of the incident light, the photocurrent output by the green photodetector represents the intensity of the green component of the incident light, the photocurrent output by the blue photodetector represents the intensity of the blue component of the incident light, and the photocurrent output by the unfiltered photodetector represents the total intensity of the red, green, and blue components of the incident light.

Figure 3A:
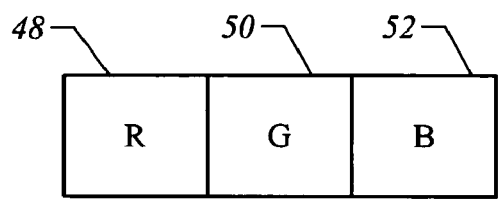
FIG. 3A depicts a top view of the color filters from FIG. 2.
Figure 3B:
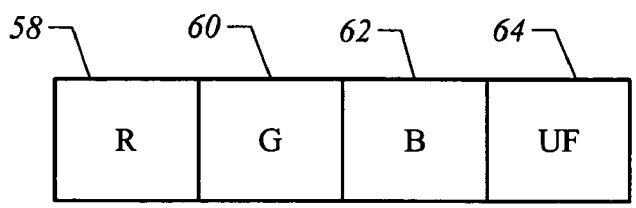
FIG. 3B depicts a top view of the photodetectors from FIG. 2.

FIG. 3A depicts a top view of the color filters 48, 50, and 52 identified as R, G, and B. FIG. 3B depicts a top view of the photodetectors 58, 60, 62, and 64 identified as R, G, B, and UF, where UF stands for "unfiltered." As depicted in FIGS. 3A and 3B, the color filters have approximately the same surface area as the corresponding photodetectors. When the color filters are positioned on top of the photodetector array and aligned with the respective photodetectors, the color filters do not cover the photodetector that is designated to detect unfiltered light. This allows the UF photodetector to be exposed to an unfiltered portion of the incident light.

Figure 4:
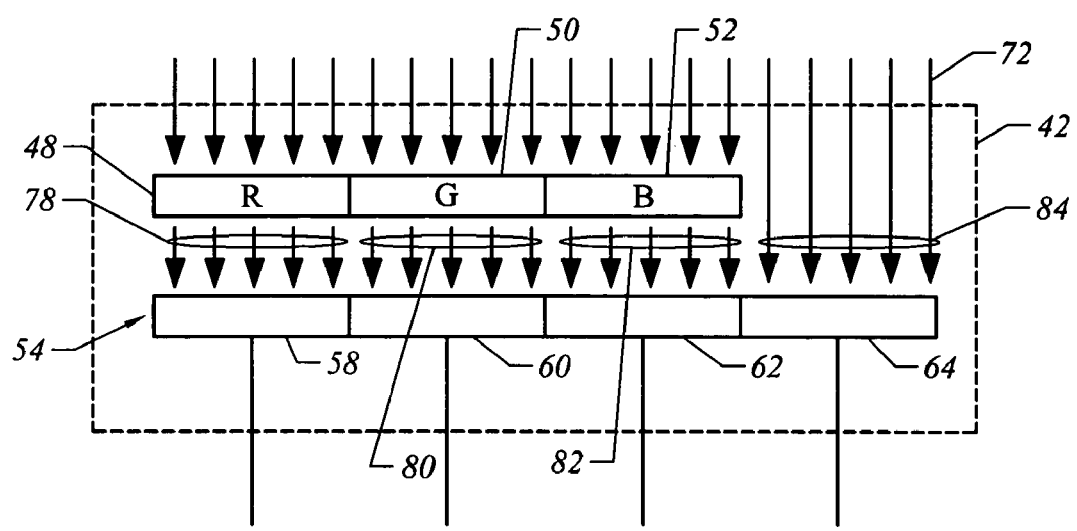
FIG. 4 depicts how light is detected by the different photodetectors from FIG. 2.

FIG. 4 graphically depicts the portions of the light that are detected by the photodetectors. As depicted in FIG. 4, light 72 is incident on the sensor module. Portions of the light are aligned with the color filters. These portions are filtered by the color filters and reach the corresponding photodetectors as filtered light. Specifically, red filtered light 78 is detected by the red photodetector 58, green filtered light 80 is detected by the green photodetector 60, and blue filtered light 82 is detected by the blue photodetector 62. The light 84 that is incident on the unfiltered photodetector is detected by the corresponding photodetector 64 without filtering.

Referring back to FIG. 2, the post-sensor amplification unit 44 includes amplifiers 70 that are specific to each of the photodetectors 58, 60, 62, and 64. For example, there is one amplifier for the red photodetector, one amplifier for the green photodetector, one amplifier for the blue photodetector, and one amplifier for the unfiltered photodetector. The amplifiers amplify and convert photocurrent from the photodetectors into analog voltages. In the embodiment of FIG. 2, the amplifiers are transimpedance amplifiers although other types of amplifiers, such as switch capacitor type amplifiers, can be used. As described above, offset voltages at the input terminals of the amplifiers can skew the output voltages (i.e., $V_{red}$, $V_{green}$, and $V_{blue}$) and negatively affect the performance of the color sensor system. The use of the output signal $V_{unfiltered}$ to correct for the voltage offset is described below.

In the embodiment of FIG. 2, the processing unit 46 utilizes digital processing techniques. The processing unit receives the analog output signals ($V_{red}$, $V_{green}$, $V_{blue}$, and $V_{unfiltered}$) from the post-sensor amplification unit 44, converts the output signals to digital signals, and processes the output signals to correct for voltage offsets that may exist. The correction for voltage offset is particularly relevant to mapping between two color spaces. Traditionally, mapping between two color spaces that have a linear relationship is accomplished using the following mapping relationship:

$$\begin{bmatrix} T_X \\ T_Y \\ T_Z \end{bmatrix} = K \begin{bmatrix} S_X \\ S_Y \\ S_Z \end{bmatrix}$$

where $[T_X\ T_Y\ T_Z]$ represents the target color-space coordinates, where $[S_X\ S_Y\ S_Z]$ represents the sensor color-space coordinates, and where K represents the linear transformation matrix.

As described herein, the matrix elements are provided in terms of XYZ tristimulus values. In the system of FIG. 2, the matrix elements $S_X$, $S_Y$, and $S_Z$ will contain the voltage offset, which contributes to an error in the mapping between the target and sensor color spaces. In such a case, it is difficult, if not impossible, to cancel the offset values present in the XYZ elements. However, with measurements from an unfiltered photodiode, offset cancellation can be achieved by replacing all of the sensor color-space coordinates, $S_X$, $S_Y$, and $S_Z$, with ($W-S_i$), where W represents the intensity of the unfiltered light as measured by the unfiltered photodetector. Making the replacement, the coordinate $S_X$ becomes ($W-S_X$), the coordinate $S_Y$ becomes ($W-S_Y$), and the coordinate $S_Z$ becomes ($W-S_Z$). The mapping relationship is now expressed as:

$$\begin{bmatrix} T_X \\ T_Y \\ T_Z \end{bmatrix} = K \begin{bmatrix} (W-S_X) \\ (W-S_Y) \\ (W-S_Z) \end{bmatrix}$$

Since offset values are present in W and every other term ($S_X$, $S_Y$, and $S_Z$) in a subtraction for this linear system, the offset effect is canceled. Specifically, the expression: (W–offset)–($S_X$–offset)=W–$S_X$ indicates how the offset inherent within both the W and $S_X$ terms cancel each other out. After cancellation, the resulting (W–S) color-space coordinates can be mapped to a conventional XYZ color-space for standard use.

In operation, measurements are made for $V_{red}$, $V_{green}$, $V_{blue}$, and $V_{unfiltered}$ in response to incident light and translated to the digital signals $S_X$, $S_Y$, and $S_Z$, and W. The target color coordinates are also provided, for example, as $T_X$, $T_Y$, and $T_Z$. The linear transformation matrix, K, is then calculated as:

$$K = \begin{bmatrix} T_X \\ T_Y \\ T_Z \end{bmatrix} \Bigg/ \begin{bmatrix} (W-S_X) \\ (W-S_Y) \\ (W-S_Z) \end{bmatrix}$$

The linear transformation matrix is then used in the mapping relationship to achieve a target color. Because the offset is included in the calculation of the linear transformation matrix, K, the impact of any voltage offset is corrected for.

In an embodiment, all of the light that is incident on the sensor module 42 may be filtered by a common filter that is located above the color filters 48, 50, and 52 and the photodetector array 54. Although all of the light will be filtered to some degree in this case, the light that is not filtered by one of the color filters is still referred to herein as "unfiltered" light.

Figure 5:
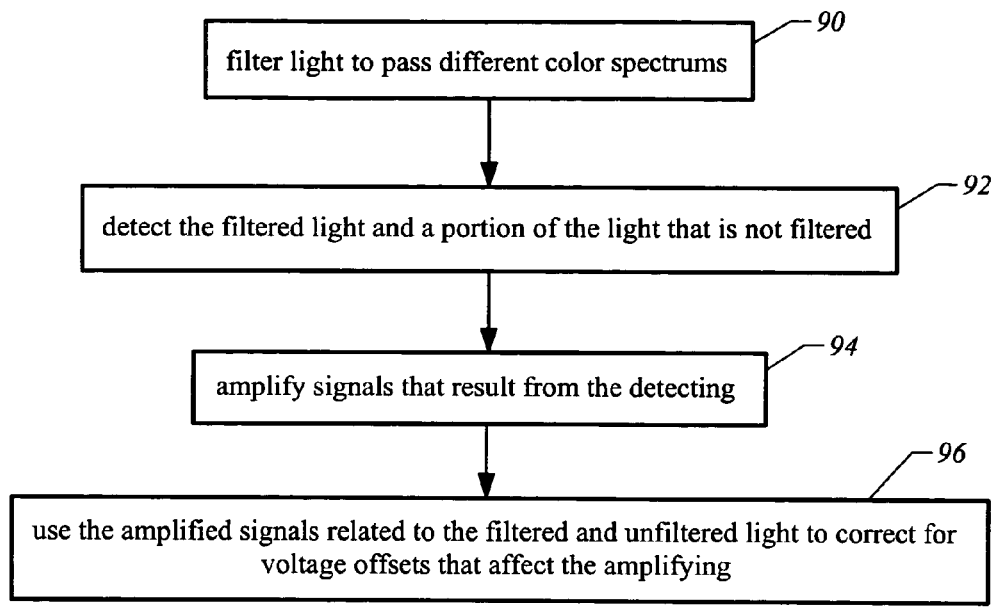
FIG. 5 depicts a process flow diagram of a method for sensing color in accordance with the invention.

FIG. 5 depicts a process flow diagram of a method for sensing color in accordance with the invention. At step 90, light is filtered to pass different color spectrums. At step 92, the filtered light and a portion of the light that is not filtered are detected. At step 94, signals that result from the detecting are amplified. At step 96, the amplified signals related to the filtered and unfiltered light are used to correct for voltage offsets that affect the amplifying.

Figure 6:
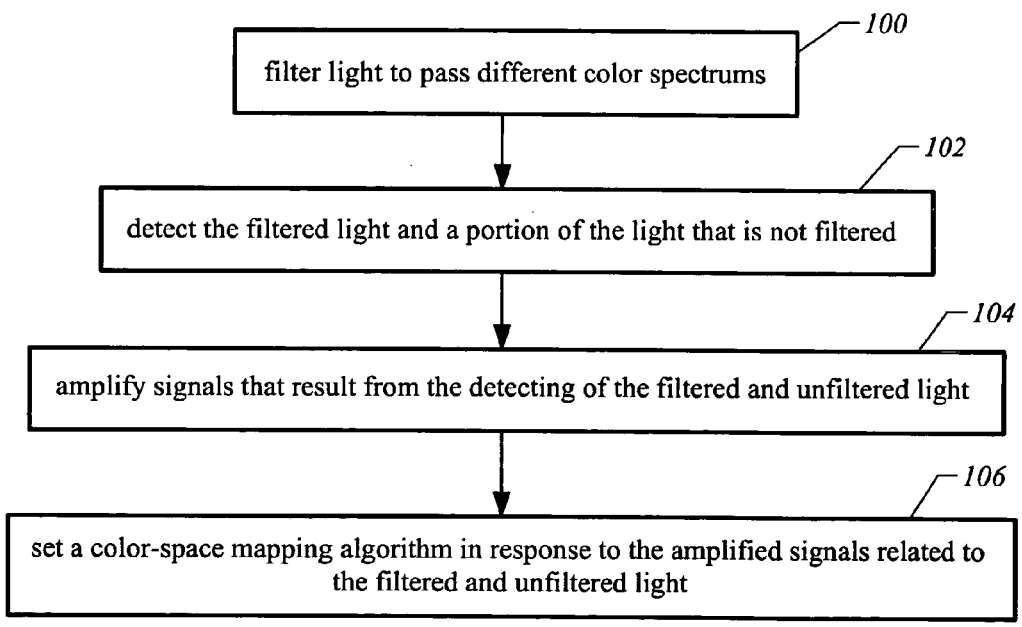
FIG. 6 depicts a process flow diagram of another method for sensing color in accordance with the invention.

FIG. 6 depicts a process flow diagram of another method for sensing color in accordance with the invention. At step 100, light is filtered to pass different color spectrums. At step 102, the filtered light and a portion of the light that is not filtered are detected. At step 104, signals that result from the detecting of the filtered and unfiltered light are amplified. At step 106, a color-space mapping algorithm is set in response to the amplified signals related to the filtered and unfiltered light.

The post-sensor amplification unit may be configured to provide different gain factors that can be selected in response to different lighting conditions, although this is not critical.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for sensing color comprising:

filtering light to pass different color spectrums;
detecting the filtered light and a portion of the light that is not filtered;
amplifying signals that result from the detecting; and
using the amplified signals related to the filtered and unfiltered light to correct for voltage offsets that affect the amplifying;
wherein using the amplified signals to correct for voltage offsets includes determining a linear transformation matrix in response to the amplified signals related to the filtered and unfiltered light; and
wherein determining the linear transformation matrix includes identifying target color-space coordinates and calculating the linear transformation matrix as a function of the target color-space coordinates and the amplified signals.

2. The method of claim 1 wherein determining the linear transformation matrix includes subtracting the output related to the unfiltered light from the outputs related to the filtered light.

3. The method of claim 1 wherein the filtered light and the unfiltered light are detected concurrently.

4. The method of claim 1 wherein filtering the light involves filtering separate portions of the light with respective red, green, and blue bandpass filters.

5. The method of claim 4 wherein detecting the filtered and unfiltered light involves detecting the red filtered light, the green filtered light, the blue filtered light, and the unfiltered light separately to generate respective red light signals, green light signals, blue light signals, and unfiltered light signals.

6. The method of claim 5 wherein the amplifying includes amplifying the red light signals, the green light signals, the blue light signals, and the unfiltered light signals and wherein using the amplified signals to correct for voltage offsets includes using the amplified signals to determine the linear transformation matrix.

7. A method for sensing color comprising:
filtering light to pass different color spectrums;
detecting the filtered light and a portion of the light that is not filtered;
amplifying signals that result from the detecting of the filtered and unfiltered light; and
setting a color-space mapping algorithm in response to the amplified signals related to the filtered and unfiltered light:
wherein the setting of a color-space mapping algorithm includes determining a linear transformation matrix in response to the amplified signals; and
wherein determining the linear transformation matrix includes identifying target color-space coordinates and calculating the linear transformation matrix as a function of the target color-space coordinates and the amplified signals.

8. The method of claim 7 wherein determining the linear transformation matrix includes subtracting the output related to the unfiltered light from the outputs related to the filtered light.

9. The method of claim 7 wherein the filtered light and the unfiltered light are detected concurrently.

10. The method of claim 7 wherein filtering the light involves filtering separate portions of the light with respective red, green, and blue bandpass filters.

11. The method of claim 10 wherein:
detecting the filtered and unfiltered light involves detecting the red filtered light, the green filtered light, the blue filtered light, and the unfiltered light separately to generate respective red light signals, green light signals, blue light signals, and unfiltered light signals; and
amplifying includes amplifying the red light signals, the green light signals, the blue light signals, and the unfiltered light signals.

12. A system for sensing color comprising:
a sensor module having color filters and photodetectors, wherein the photodetectors include photodetectors that are aligned with the color filters to detect light that passes through the respective color filters and at least one photodetector that is aligned to detect light that is not filtered by the color filters;
a post-sensor amplification unit in signal communication with the photodetectors configured to amplify signals from the photodetectors; and
a processing unit in signal communication with the post-sensor amplification unit configured to use the amplified signals from the photodetectors to correct for voltage offsets at the post-sensor amplification unit;
wherein:
the color filters are red, green, and blue bandpass filters and the photodetectors generate respective red light signals, green light signals, blue light signals, and unfiltered light signals;
the post-sensor amplification unit includes amplifiers for amplifying the red light signals, the green light signals, the blue light signals, and the unfiltered light signals; and
wherein using the amplified signals to correct for voltage offsets includes determining a linear transformation matrix by identifying target color-space coordinates and calculating the linear transformation matrix as a function of the target color-space coordinates and the amplified signals.

13. The system of claim 12 wherein the processing unit is configured to use the amplified signals from the post-sensor amplification unit to determine the linear transformation matrix in response to the amplified signals related to filtered and unfiltered light.

14. The system of claim 13 wherein the linear transformation matrix is determined by subtracting the output related to unfiltered light from the outputs related to filtered light.

15. A system for sensing color comprising:
a sensor module having color filters and photodetectors, wherein the photodetectors include photodetectors that are aligned with the color filters to detect light that passes through the respective color filters and at least one photodetector that is aligned to detect light that is not filtered by the color filters;
a post-sensor amplification unit in signal communication with the photodetectors configured to amplify signals from the photodetectors; and
a processing unit in signal communication with the post-sensor amplification unit configured to use the amplified signals from the photodetectors to correct for voltage offsets at the post-sensor amplification unit
wherein using the amplified signals to correct for voltage offsets includes determining a linear transformation matrix by identifying target color-space coordinates and calculating the linear transformation matrix as a function of the target color-space coordinates and the amplified signals.

* * * * *